United States Patent [19]

Gebhardt

[11] Patent Number: 4,715,766
[45] Date of Patent: Dec. 29, 1987

[54] COMBINED DISTRIBUTION APPARATUS FOR PIECE GOODS

[75] Inventor: Guenter Gebhardt, Sinsheim, Fed. Rep. of Germany

[73] Assignee: Gebhardt Fordertechnik GmbH, Sinsheim, Fed. Rep. of Germany

[21] Appl. No.: 858,845

[22] Filed: Apr. 30, 1986

Related U.S. Application Data

[63] Continuation of Ser. No. 562,740, Dec. 19, 1983, abandoned.

[30] Foreign Application Priority Data

Dec. 20, 1982 [DE] Fed. Rep. of Germany ....... 3247126

[51] Int. Cl.$^4$ ............................................. B65G 67/00
[52] U.S. Cl. ................................. 414/392; 198/468.6; 414/399; 414/529; 414/531; 414/917; 414/278
[58] Field of Search ............... 414/341, 347, 349, 390, 414/392, 399, 529, 531, 917, 278; 198/790, 614, 744, 851, 468.6

[56] References Cited

U.S. PATENT DOCUMENTS

| 2,346,659 | 4/1944 | Bruce | 198/760 X |
| 2,915,204 | 12/1959 | Alimanestiano | 198/468.6 X |
| 3,212,654 | 10/1965 | Dolphin | 414/341 |
| 3,247,949 | 4/1966 | McDougall | 198/614 X |
| 3,313,429 | 4/1967 | Cole | 414/392 |
| 3,392,858 | 7/1968 | Fernstrom et al. | 414/495 |
| 3,437,219 | 4/1969 | Stevenson, III | 414/391 |
| 3,853,230 | 12/1974 | Schultz | 414/392 X |
| 4,565,483 | 1/1986 | Huelster et al. | 414/529 X |

FOREIGN PATENT DOCUMENTS

| 217368 | 9/1961 | Austria | 414/345 |
| 135354 | 10/1981 | Japan | 414/390 |

Primary Examiner—Leslie J. Paperner
Assistant Examiner—Stuart J. Millman
Attorney, Agent, or Firm—Barnes & Thornburg

[57] ABSTRACT

A distribution apparatus for the distribution of piece goods to different stations which is equipped with a transporting system for the pick-up and delivery of the piece good and with a chassis adapted to be driven; in order to enable the loading and unloading of differently constructed stations, the transporting system of the distribution apparatus includes a roller or chain type conveyor and a loading fork arranged coaxially thereto, whereby the loading fork is mounted on a chassis so as to be liftable and lowerable and both the conveyor and loading fork are adapted to be driven for loading and unloading.

6 Claims, 7 Drawing Figures

COMBINED DISTRIBUTION APPARATUS FOR PIECE GOODS

This is a continuation of application Ser. No. 562,740, filed Dec. 19, 1983 and now abandoned. The present invention relates to a combined distribution apparatus for generally piece goods, especially for flat plate-like goods e.g., pallets, with a transporting system for the pick-up and delivery of the piece good.

Distribution apparatus are already known in the prior art, which transport a piece good from one station to another station. The conveying means of the stations are constructred identically, to which is matched the conveyor system of the distribution apparatus. The transport can, therefore, take place only from one conveying means to another conveying means of the same type. The field of application of such a distribution apparatus is, therefore, very limited. For the transfer to another transport system, transfer stations, properly speaking, are necessary for that reason, as a result of which the entire distribution installation becomes costly in its installation and control.

Accordingly, it is the principal object of the present invention to provide a universal distribution apparatus, by means of which stations of different construction can be serviced.

The underlying problems are solved according to the present invention in that a roller or chain conveyor and a loading fork are provided as transport system in the same transporting direction and coaxial, which are both adapted to be selectively driven in the loading or unloading direction and are supported on a chassis frame adapted to be driven transversely to the transport direction.

The advantages achieved with the present invention include, particular, in that a combined transporting system is present; which makes it possible to take piece goods from a stationary station or from a transporting station respectively to deliver the same thereto. A piece good can thus be moved at will between stations of different construction. The piece good can thus be selectively fed to a storage facility separately according to type of goods or be removed therefrom and transported to a delivery station. A compact apparatus is obtained from the combined arrangement of two conveyance systems into a single transporting system, which is small in its dimensions and universal in its applicability.

These and further objects, features and advantages of the present invention will become more apparent from the following description when taken in connection with the accompanying drawing which shows, for purposes of illustration only, one embodiment in accordance with the present invention, and wherein.

Figure 7:
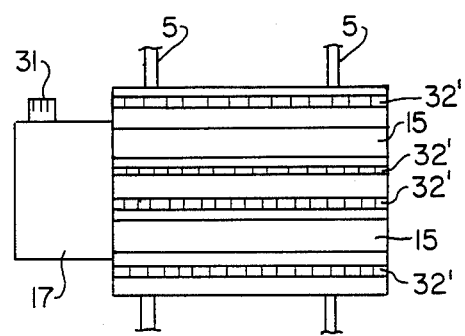

FIG. 7 schematically shows a modification of the distribution apparatus of FIGS. 1–6 wherein the roller conveyors are replaced with chain conveyors.

Figure 1:
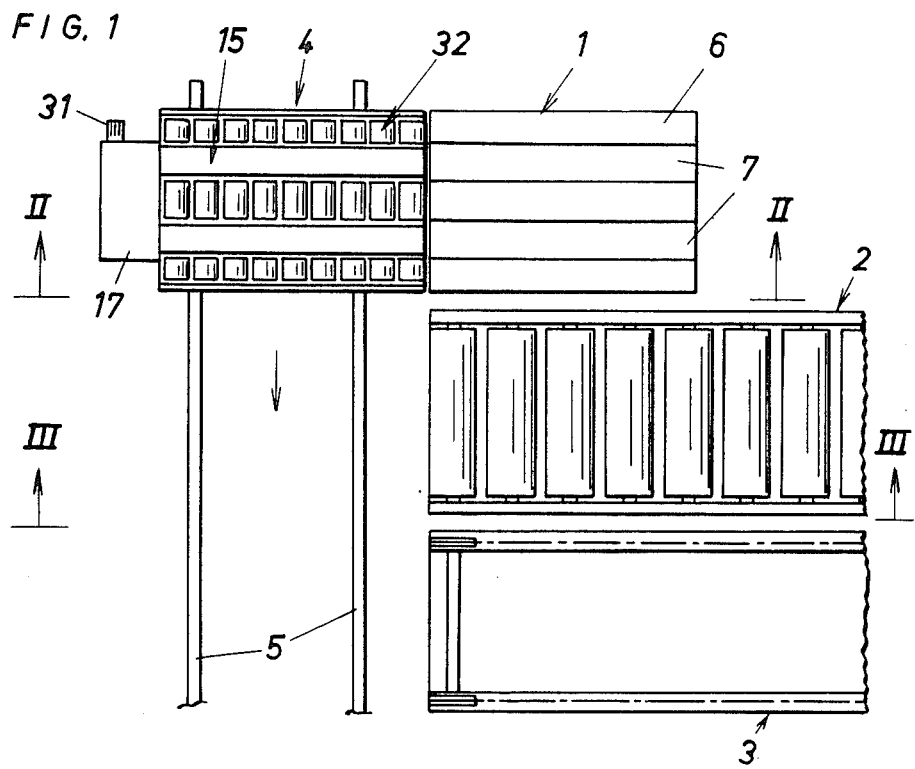
FIG. 1 is a somewhat schematic plan view of a distribution installation with a distribution apparatus and different transfer stations in accordance with the present invention.

Referring now to the drawing wherein like reference numerals are used throughout the various views to designate like parts, the distribution installation illustrated in FIG. 1 includes a stationary deposit or storage station generally designated by reference numeral 1 and several transport stations generally designated by reference numerals 2 and 3. The latter may be constructed as rollertype or chaintype conveyors or also as gravity-type conveyors. Of course, several stationary and transporting stations 1 to 3 may be provided in a distribution installation, depending on need. A distribution apparatus generally designated by reference numeral 4 is provided at the ends of these stations 1 to 3, which is adapted to travel on rails 5. As examples for the construction of stations, the deposit station 1 includes a platform 6 with longitudinal grooves 7 extending toward the distribution apparatus 4, whereas a roller conveyor 2 is constructed in the illustrated embodiment as driven or gravity operated roller conveyor, and a driven chain conveyor 3 is provided as transport station, which, by themselves, may also be constructed as non-driven back-up conveyors.

The distribution apparatus 4 includes a chassis frame generally designated by reference numeral 8, which includes two shafts 9 that are rotatably supported in longitudinal profiles 10. Wheels 11 which roll on the rails 5 pairwise are secured on the shafts 9. One of the shafts 9 is driven by a motor 12 (FIGS. 2 and 3), whereby preferably a drive transmission of the other shaft 9 occurs by way of a belt or chain drive 13. U-shaped bearer profiles 14 (FIG. 6) which are directed transversely to the transporting direction of the chassis frame 8, rest on the longitudinal profiles 10. Two bearer profiles 14' and 14" are thereby provided on both sides symmetrically to the transverse axis of the distribution apparatus 4, of which the inner bearer profiles 14' (FIGS. 5 and 6) are arranged adjacent one another with a spacing therebetween. The latter serve as track for a loading fork generally designated by reference numeral 15.

The loading fork 15 includes two downwardly open, U-shaped loading profiles 16 extending in parallel and over the width of the distribution apparatus 4, which are rigidly connected with each other by a housing 17 at the end opposite the loading and unloading end. Each loading profile 16 is supported on a chassis frame generally designated by reference numeral 18 that is adapted to be displaced in the bearing profiles 14'. The chassis frame 18 includes two parallel profiles 19, between which rollers 20 are rotatably supported. The profiles 19 are pivotally connected with the loading profiles 16 by rocker arms 21. An adjusting lever 22 is pivotally connected with the profiles 19 at the housing-side end thereof, which is pivotally supported at its other end on a crank 23. The crank 23 is secured on a shaft 24 rotatably supported in the housing 17. The shaft 24 is operatively connected by way of a belt or chain drive 25 with a lift motor 26 which is equipped with a self-blocking transmission or a holding brake of conventioanl construction.

An endless chain 27 or the like is additionally secured at the housing-side end of each profile 19, which is reversed at the unloading end by a rotatable wheel 28 supported on the bearing profile 14' and is placed over a drive wheel 29 within the housing 17. One chain 27 each is coordinated to each pair of profiles 19, whose driving wheels 29 are coupled with each other by a shaft 30. A driving motor 31 serves for the drive of the shaft 30, which is also equipped with a self-locking transmission or a holding brake.

The conveying elements of a transporting stationary conveyor generally designated by reference numeral 32, such as roller 32 (FIGS. 1-6) or chain conveyors 32' (FIG. 7), are arranged in the two bearing profiles 14" and preferably also between the two inner bearing profiles 14'. A roller conveyor will rollers 33 rotatably supported one behind the other in the transporting direction are illustrated in the drawing. At least the two outer roller rows are driven by a belt or chain dirve 34, which are both driven synchronously by one wheel 36 each connected with each other by a shaft 35 and by a conveyor motor 37 coupled thereto.

Figure 2:
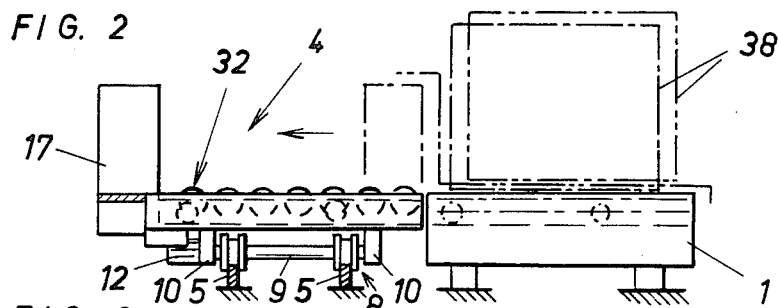
FIG. 2 is a somewhat schematic cross-sectional view taken along line II—II of FIG. 1.

It can be seen that the loading fork 15 in its neutral position lies below the transport plane of the conveyor 32. If, for example, a piece good 38 is to be picked up from the deposit station 1, then the distribution apparatus 4 travels in front of this station 1. The correct position is thereby monitored and controlled by conventional control elements in a manner known as such and, therefore, not described in detail herein. As soon as the command for the pick-up of the piece good 38 is given, the loading fork 15 moves out in the direction toward the deposit station 1 whereby the chassis frame 18 rolls out of the bearing profiles 14' into the longitudinal grooves 7 of the deposit station 1 and the loading profiles 16 reach underneath the piece good 38 which had been placed on the deposit station 1. For this purpose, the motor 31 is turned on or energized in order to drive the chain 27 in the clockwise direction until a predetermined end position is reached, as indicated in dash and dotted lines in FIG. 2. The lifting motor 26 is now turned on or energized so that the cranks 23 rotate in the clockwise direction. Since the profiles 19 of the chassis frame 18 are blocked by the chains 27, the loading profiles 26 are thus lifted by the pivoting of the rocker levers 21 in the clockwise direction and together therewith the piece good 38 is lifted, as indicated in FIG. 2 in dash and double dot lines. Then, by turning-on or energizing the driving motor 31 in the opposite direction, the loading fork 15 together with the piece good 38 travels back into the starting position on the distribution apparatus 4, where, by engagement of the lifting motor 26 in the opposite direction, the piece good 38 is deposited or placed on the conveyor 32. The piece good 38 can now be transported by the distribution apparatus 4 into the predetermined position in front of another station and can be transferred thereat.

Figure 3:
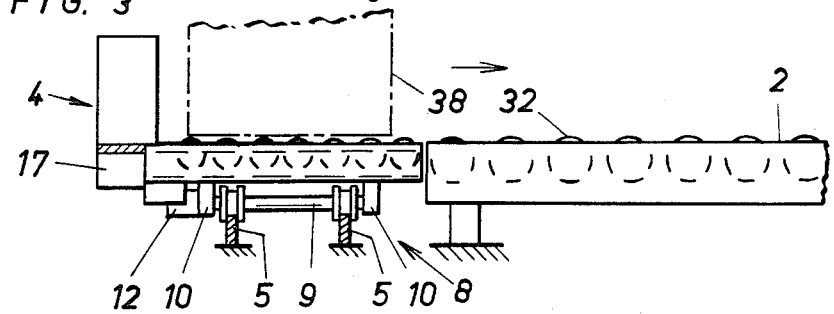
FIG. 3 is a somewhat schematic cross-sectional view taken along line III—III of FIG. 1.
Figure 4:
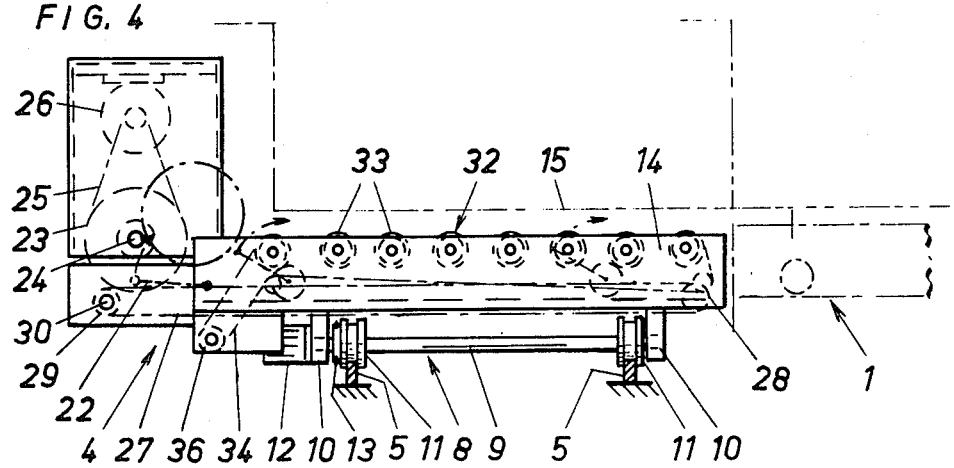
FIG. 4 is a somewhat schematic side elevational view of the distribution apparatus in accordance with the present invention.
Figure 5:
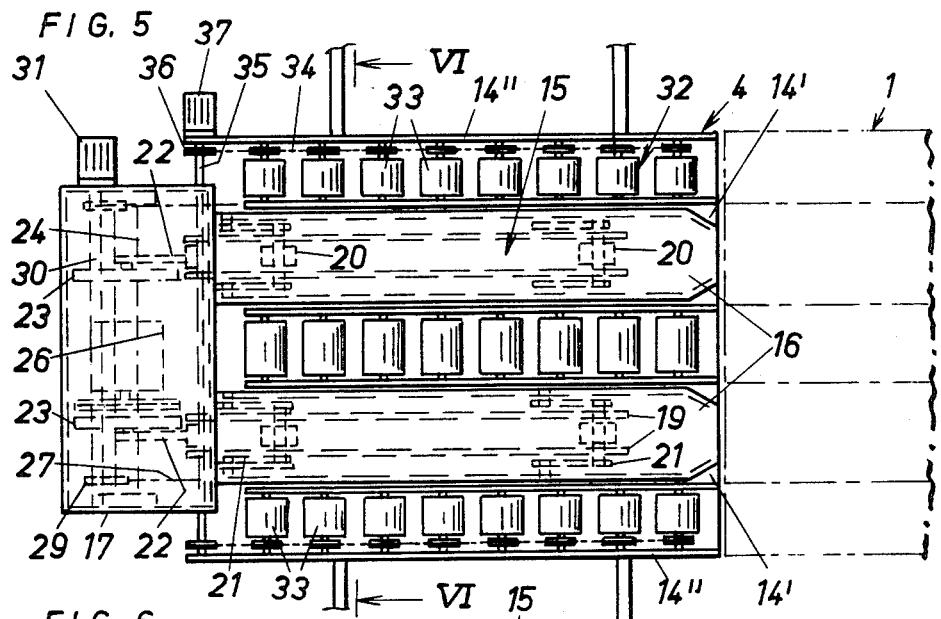
FIG. 5 is a plan view on the distribution apparatus of FIG. 4.
Figure 6:
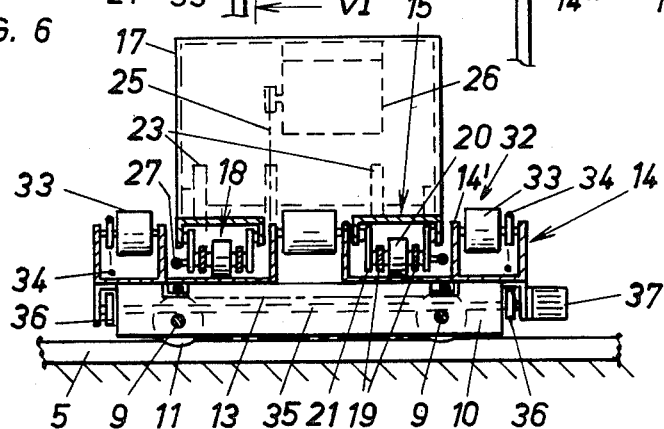
FIG. 6 is a somewhat schematic cross-sectional view taken along line VI—VI of FIG. 5.

If this station is constructed as transporting station with roller or chain conveyors, then the conveyor motor 37 is turned on so that the rollers 3 of the chains of the conveyor 32 rotate in the clockwise direction, as viewed in FIG. 3, and the piece good 38 reaches the conveyor of the transporting station 2 or 3 by movement toward the right in order to be continued to be transported thereon. Of course, the unloading station which is connected downstream, can also be constructed as a deposit or storage station like station 1. The described operating cycle for the movement of the loading fork 15 is then repeated in reverse order to deposit the piece good 38 on the loading surface. Of course, an appropriate corresponding control of known construction is provided in order to permit an automatic loading and unloading whereby the movement of the piece good is monitored by light bearers or the like. Since these controls are known as such and form no part of the present invention, a detailed description thereof is dispensed with herein.

While I have shown and described only two embodiments in accordance with the present invention, it is understood that the same is not limited thereto but is susceptible of numerous changes and modifications as known to those skilled in the art, and I, therefore, do not wish to be limited to the details shown and described herein but intend to cover all such changes and modifications as are encompassed by the scope of the appended claims.

I claim:

1. A distribution apparatus for piece goods, comprising a transporting system for picking up and delivering a piece good, the transporting system including plural conveyor means and plural loading fork means, said plural loading fork means being disposed in a manner such that they can be raised and lowered relative to the plural conveyer means and being operable in the transporting direction, drive motor means for selectively driving both the plural conveyor means and the plural loading fork means in the transporting direction for loading and unloading, and means for supporting said plural conveyor means and said plural loading fork means on a displaceable frame means operably shiftable transversely of the transporting direction, the plural loading fork means being supported on a displaceable chassis means operable to travel in the transporting direction, said displaceable chassis means including plural lever means each having one end thereof pivotally attached to the plural fork means near the ends thereof, roller means at another end of the plural lever means and supported in U-shaped bearer profile means on the displaceable frame means, plural actuating means extending below the plural fork means, each lever means on a fork means being pivotally attached to one of the plural actuating means, the plural conveyor means being supported in part by one side of the U-shaped bearer profile means, said drive motor means including drive means for each of the plural conveyor means and connected to the plural conveyor means and to the drive motor means, the drive motor means having a motor means fixedly mounted on the displaceable frame means and also drivingly connected to the plural actuating means to laterally shift the plural actuating means in the transporting direction to thereby pivot the plural lever means to cause the plural loading fork means to be raised in height above the plural conveyor means, said drive motor means also connected to plural fork shifting means mounted to an underside of the plural fork means to provide for shifting of the shiftable carriage means attached to the plural fork means in the transporting direction, and said fixedly mounted motor means being located at an edge of the displaceable frame means at a point away from the transporting direction.

2. A distribution apparatus according to claim 1, wherein said plural conveyor means are rollertype conveyors.

3. A distribution apparatus according to claim 1, wherein said plural conveyor means are chaintype conveyors.

4. A distribution apparatus according to claim 1, wherein the apparatus is able to handle piece goods in the form of flat, plate-like elements.

5. A distribution apparatus according to claim 1, wherein the plural conveyor means are arranged on both sides of the plural loading fork means.

6. A distribution apparatus according to claim 5, wherein the plural conveyor means includes conveyor elements of which at least the conveyor elements arranged on the outside of and adjacent to the loading fork means are driven conveyor elements.

* * * * *